July 29, 1958 C. H. HOEPPNER 2,845,534

SECONDARY EMISSION TRIGGER CIRCUIT

Filed May 15, 1945 2 Sheets-Sheet 1

Inventor
CONRAD H. HOEPPNER

By Ralph L. Chappell
Attorney

July 29, 1958 C. H. HOEPPNER 2,845,534

SECONDARY EMISSION TRIGGER CIRCUIT

Filed May 15, 1945 2 Sheets-Sheet 2

Inventor
CONRAD H. HOEPPNER

By Ralph L. Chappell

Attorney

United States Patent Office 2,845,534

Patented July 29, 1958

2,845,534

SECONDARY EMISSION TRIGGER CIRCUIT

Conrad H. Hoeppner, Washington, D. C.

Application May 15, 1945, Serial No. 593,907

2 Claims. (Cl. 250—27)

(Granted under Title 35, U. S. Code (1952), sec. 266)

This invention relates broadly to multivibrator-type electronic circuits and in particular to a class of electronic circuits referred to as switching or trigger circuits.

All such electronic circuits of this particular class have the common characteristic in their fundamental form of being capable of maintaining either one of two distinct states of equilibrium which may be selectably called into being by the application of external signals. The maintenance of such external signals is not a requisite for the maintenance of the circuit state of equilibrium which such signals call into being. It has naturally followed from the triggering action of the applied signal that such circuits have become known as trigger circuits. Similarly, their action in switching from one equilibrium state to the other has led them to be known by the term electronic switches.

Trigger circuits heretofore known, and particularly those employing high vacuum-type tubes, ordinarily require the use of two tube elements together with a considerable number of circuit components for inter-connection of said elements.

It is an object of this invention to provide an electronic trigger circuit which requires a single vacuum-tube element together with a minimum of associated circuit components in its construction.

It is another object of this invention to provide an electronic circuit capable of maintaining either one of two stable states and capable of regenerative change from one state to the other in response to signals applied from external sources.

It is another object of this invention to provide a trigger circuit in which the power requirement in one of its quiescent states, which may be termed standby condition, is reduced to a minimum.

It is another object of this invention to provide an electronic trigger circuit in which the phenomenon of secondary emission is employed to provide regenerative amplification.

Other objects and features of this invention will become apparent upon a careful consideration of the following detailed description when taken together with the accompanying drawings in which.

Figure 1:
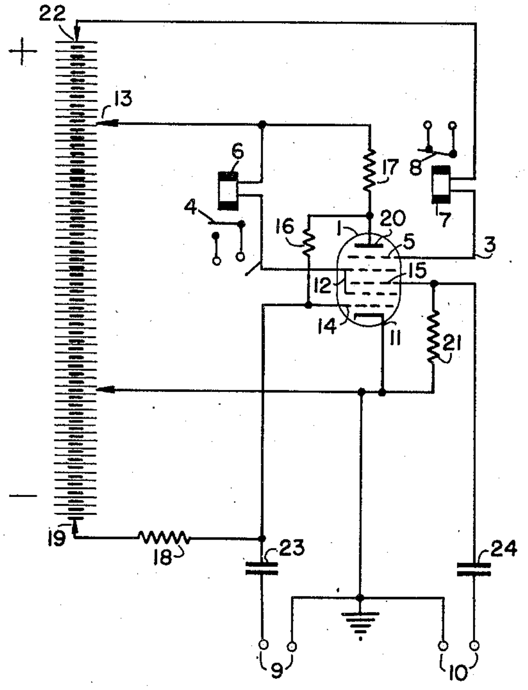
Fig. 1 is the circuit diagram of one embodiment of this invention.

Reference is now had in particular to Fig. 1 wherein there is shown one form of a secondary emission trigger circuit constructed according to the teachings of this invention. In this embodiment tube 1 represents the single vacuum-tube element required for the circuit and has for purposes of illustration been shown as of the multi-grid type. It is to be understood, however, that an ordinary pentode or tetrode can also be used if desired. In screen grid lead 2 of tube 1 is disposed winding 6 of a current-actuated relay switch 4, which, in the de-energized condition, is open as shown in the diagram. In lead 3 of grid 5 is disposed winding 7 of a second current-actuated relay switch 8, which, in the de-energized condition, is closed as shown in the diagram. To switches 4 and 8 are connected circuits which may correspond to any suitable devices, not shown, such as two electric motors, which are to be operated alternately, or to a device which is to have two alternate modes of operation, such as the forward and reverse operation of an electric motor. In a manner which will be explained in the following paragraphs, the application of external signals to input terminals 9 and 10 results in the alternate energizing and de-energizing of windings 6 and 7. This in turn results either in having the circuit of switch 4 closed and that of switch 8 open or, alternately, that of switch 4 open and that of switch 8 closed. Whenever a change in mode of operation is desired, a triggering signal at input terminals 9 or 10 causes the change over which remains as a quiescent condition until the application of a succeeding triggering signal.

Cathode 11 of tube 1 is so connected to ground potential and dual screen grid 12 is so connected to positive potential 13 through winding 6 that a positive potential gradient exists in tube 1 for the acceleration of electrons from the space charge of cathode 11. The number of electrons leaving the space charge is controlled primarily by control grids 14 and 15 with grid 14 presenting the most sensitive control means.

Grid 14 is so connected to positive potential 13 through resistances 16 and 17 and to negative potential 19 through resistance 18 that in one quiescent state no space current will flow, and the potential at anode 20 of tube 1 will be such as to hold the potential of grid 14 by means of the latter's connection to the anode 20 enough negative with respect to cathode 11 to effectively block any space current flow in tube 1.

By means of the connection between the anode 20 and the control grid 14, the potential of grid 14 tends to follow the potential variations of anode 20. This means that a form of feedback is employed during the transition of the circuit from one quiescent condition to the other at which time there will be rapid variation in the potential of anode 20.

Control grid 15 is at ground potential during either quiescent condition of the circuit by virtue of its connection through resistance 21 and thereby acts to reduce space current flow in tube 1 only during the application of a negative triggering signal at input terminals 10. It therefore functions as a triggering grid and does not act primarily to alter the space current in such a manner as to maintain either of the possible equilibrium states of tube 1.

Grid 5 is so connected to high positive potential 22 through winding 7 that a positive potential gradient exists from screen 12 to grid 5. A negative potential gradient exists from grid 5 to anode 20 by virtue of the connection of anode 20 to lower positive potential 13 through resistance 17 and negative potential 19 through resistances 16 and 18.

Under the conditions in which grid 14 permits space current flow, the electrons which leave the cathode space charge under the accelerating influence of screen 12 divide into a rather complex grouping. Certain of the electrons leave the stream by virtue of collision with the surface of one of the other of the grids. Certain of the lower velocity electrons are gathered to screen 12 by anode action. A similar group is attracted to grid 5 by anode action. Those, however, which avoid collision and the anode action of grids 12 and 5 overcome the negative gradient from grid 5 to anode 20 and, therefore, collide with anode 20. This last group constitutes conventional plate current flow which travels in such a direction through resistance 17 as to lower the potential of anode 20. This conventional plate current, since it originates from the flow of primary electrons to anode 20, may be termed primary current to distinguish it from the plate current described below which flows as the result of secondary emission from anode 20.

As the primary electrons which eventually reach anode 20 pass screen 12, they emerge into the positive potential gradient existing from screen 12 to grid 5 and are thus accelerated further to the extent determined by the potentials of screen 12 and grid 5. The terminal velocity of the primary electrons is, upon collision with anode 20, sufficient to cause secondary electrons to be dislodged from the surface of that electrode. The total number of such bombardment-emitted electrons is a function of the number of the primary electrons bombarding anode 20, their collision velocity, and the work-function energy of the surface of anode 20. The bombardment-emitted electrons emerge into a potential gradient which is positive from anode 20 to grid 5 so that, except when this potential gradient is altered as hereinafter described, all such secondary electrons travel to and are collected by grid 5.

It will be seen that the direction of plate current flow represented by the escape of secondary electrons from anode 20 is opposite to that represented by the primary electrons reaching anode 20. Thus the potential of anode 20, as determined by plate current flow through resistance 17, is a function of the ratio of secondary current to primary current. When this ratio exceeds unity, the potential of anode 20 becomes more positive than it would be if no space current flowed in tube 1. As the ratio increases, the potential of anode 20 likewise increases; and as the ratio decreases, the potential of anode 20 likewise decreases. In a trigger circuit constructed according to the teachings of this invention, shown in one form in Fig. 1, the ratio of secondary to primary current and likewise the variation in the potential of anode 20 ($E_p$) takes the general form of curve 25 of Fig. 2 when plotted against the potential of grid 14 ($E_g$). Value on the vertical coordinate corresponds to a secondary to primary current ratio of unity or to the potential assumed by anode 20 when there is no space current flow in tube 1. In the grid potential range more negative than *a*, tube 1 is cut off, the ratio is unity, and the potential of anode 20 is determined solely by its connection to potential 13 through resistor 17 and potential 19 through resistors 16 and 18. In the grid potential range from *a* to *b* the ratio decreases below unity, and anode 20 falls in potential. In the range *b* to *c* the ratio increases, passes through unity, and goes to a maximum at *c*. In the grid range more positive than *c* the ratio decreases and again passes through unity. Likewise, the potential of anode 20 reaches a maximum at *c* and decreases with more positive grid potential until it becomes more negative than value 26.

In the range from *a* to *b* space current flows in tube 1, but the average velocity with which the electrons bombard anode 20 is insufficient to cause the amount of secondary emission required to achieve a balance with the flow of primary electrons. At grid potential *b* this balance is reached, and in the range from *b* to *c* secondary emission increases with respect to primary electron flow as the average velocity of the electrons bombarding anode 20 increases. At point *c* the effects of two corollary phenomena become strong enough to reverse the trend. The first of these phenomena comprises the space charge effect of the electron stream traveling at high velocity toward anode 20. This space charge, which increases as the density of the electron stream increases, forces an increasing number of secondary electrons from anode 20 back to anode 20. The second of these phenomena comprises the potential drop of grid 5 caused by the flow of current through winding 7. A drop in the potential of grid 5 represents a decrease in the accelerating force acting on the electrons emerging from the region of screen 12.

Grid 14, by virtue of its control function and by virtue of its connection to anode 20 through resistance 16, both affects and and is affected by space current flow. In the range beyond *c* of Fig. 2 any positive excursion of grid 14 potential decreases the potential of anode 20. This is fed back to grid 14 and tends to neutralize the original change at that point. Likewise, any negative excursion of grid 14 in that range produces a positive change at anode 20, and this, fed back to grid 14, tends to neutralize the original change. Thus the range beyond *c* represents a region of degenerative feedback and stability. On the other hand, range *b* to *c* represents a region of instability in which a change of either polarity at grid 14 appears as an amplified signal of the same polarity at anode 20. This amplified signal fed back to grid 14 reinforces the original signal, and thus the regenerative amplification usually characteristic of electronic trigger circuits is introduced into the circuit of Fig. 1. In this circuit resistors 16, 17, and 18 are so proportioned that, when no space current flows in tube 1, tube 1 is cut off and the potential of grid 14 is at some value below *a*, such as *d* of Fig. 2.

In addition, resistors 16 and 18 are so proportioned that, when anode 20 is at potential 27, grid 14 is at potential *e*. A straight line 28 drawn through point *d*, and the point whose coordinates are *e* and 27, is obviously the locus of all points satisfying the equation $E_p=mE_g+C$ where $E_p$ and $E_g$ are the anode and grid voltages respectively, where *m* is the slope determined by the proportions of resistances 16 and 18, and where C is a constant determined by this same proportion and by the voltage at point 19 on the battery. It will be seen that the points of intersection *d*, *e*, and 27, and *g* and 29 of line 28 and curve 25 represent the only states of equilibrium of the conditions imposed by both the tube characteristics and the voltage divider formed by resistances 16 and 18. All other points either lie off both the curve and the line or satisfy one set of conditions and not the other. Let it be assumed that grid 14 is at potential *d*. Tube 1 is thereby held in a nonconducting condition and anode 20 is at potential 26 and both the line and the curve are in agreement. This point of equilibrium represents a stable state, since any slight circuit disturbance, such as a minor power supply fluctuation, could at most so affect circuit potentials that tube 1 was driven into the conducting region between grid potential *a* and *b*. When this occurs, the degenerative feedback initiated by the decrease in potential of anode 20 resists the exciting disturbance and drives grid and anode potentials back to the point of equilibrium. Thus is established one of the two quiescent states of the trigger circuit of Fig. 1 and is the state in which grid 14 prevents flow of space current. Since no electrons leave the cathode space charge, no current can flow in lead 2 connected to screen 12 or in lead 3 connected to grid 5. Both relays are therefore de-energized; switch 4 is open and switch 8 closed, and these relay states are characteristic of one quiescent state of the trigger circuit. If a positive signal be applied at input terminals 9 and communicated to grid 14 through capacitor 23, and if this signal be of such an amplitude that the feedback from anode 20 to grid 14 is strongly regenerative, a condition which is typified by the region *b* to *c* of Fig. 2, the exciting signal will be reinforced by the feedback; and the grid will be driven to potential *e* and the plate to potential 27. This represents a condition of equilibrium which is stable, since any slight random variation of grid potential 14 or anode 20 potential causes the tube to operate in the degenerative region beyond *c* so that the random variation is neutralized and grid 14 and anode 20 are driven back to potential *e* and 27 respectively. Thus is established the other of the two quiescent states of the trigger circuit of Fig. 1. The potential of grid 14 is *e* which is considerably above cut-off potential for tube 1 and space current therefore flows. Screen 12, since it is positive, collects some of the electrons by collision and some by anode action, this collection representing the current flow through lead 2 and winding 6. This current flow energizes the relay, and switch 4 is closed. Likewise, grid 5 collects primary electrons by collision and anode action. Grid 5 also collects secondary electrons from anode 20. This combined collection represents current flow through lead 3 and winding 7. This current flow energizes the relay, and switch 8 is opened. These relay states are therefore characteristic of the second of the two quiescent states of the circuit.

Let it now be assumed that a negative signal is applied to input terminals 10 and communicated to grid 15 through capacitor 24 of sufficient amplitude to so reduce space current flow between screen 12 and anode 20 that tube 1 is again operating in the strongly regenerative region. The regenerative feedback causes the action of grid 14 to reinforce the effect of the negative signal applied to grid 15, and the circuit returns to the quiescent condition first assumed and described.

It will be seen that the circuit could have arrived at the point of equilibrium represented by grid potential $g$ and anode potential 29 during its transition from one quiescent state to the other. This is not a stable point of equilibrium, however, and is never experienced in practice, since the slightest variation in the potential of either grid 14 or anode 20 is regeneratively amplified so as to prevent the maintenance of the potential represented by coordinates $g$ and 29.

The foregoing illustrates the manner in which external signals applied to input terminals 9 and 10 of the trigger circuit of Fig. 1 serve to call into being selectably either of two stable states each characterized by different states of switches 4 and 8. In one stable state of the trigger circuit, both windings 6 and 7 are de-energized and no current flow in leads 2 and 3. Grid 14 holds tube 1 below cut-off, and the only current flow is that through resistances 16 and 17 and 18 between potentials 13 and 19.

To those versed in the art there will occur alternate triggering methods which, though they may be preferable for certain applications, do not exceed the limits of this invention. An example of this would be to so choose the value of capacitor 23 and resistance 18 that the time constant of the circuit thus formed constitutes a peaker in terms of the duration of the pulse applied to input terminals 9. This permits the application of a negative pulse to input 9 as well as to input 10 for triggering purposes, since the positive excursion at grid 14 coincident with the trailing edge of the peaked signal would serve to trigger the tube into regenerative conduction. Another example of alternative triggering is to choose capacitor 23 and resistance 18 that the time constant of the input circuit is long compared to the time duration of the input signals. With this arrangement the circuit of Fig. 1 can be triggered into one quiescent state by a positive pulse and into the other by a negative pulse, both applied to input 9.

This last-mentioned arrangement, requiring only one control grid for triggering purposes, permits the use of a pentode vacuum tube in lieu of the multigrid tube illustrated. Furthermore, in certain instances it may be desirable to actuate but one of the relays, relay 4 for example. In this case the multigrid tube 1 may be replaced by an ordinary tetrode.

It will have been noted that the vacuum-tube element of the trigger circuit of Fig. 1 was in a non-conducting condition and therefore represented no drain on the power supply during one of the quiescent states. The only current requirement was that which flowed from potential 13 to potential 19 through resistances 16, 17, and 18 to maintain the quiescent potentials of anode 20 and grid 14. This is a novel feature of this form of secondary emission circuit, and it may be employed to advantage in certain applications to reduce overall power-supply requirements or to assist in power supply regulation in cases in which the circuit is a component of an electronic device having large current requirements during the non-conducting quiescent state of the trigger circuit.

Figure 3:
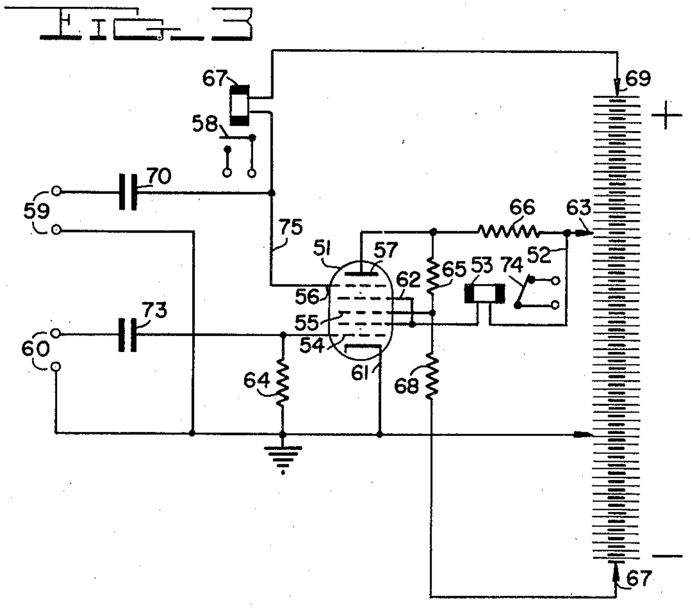
Fig. 3 is the circuit diagram of another embodiment of this invention.

Again, certain variations may be made which provide a different triggering method and which tend to balance the current requirements of the trigger circuit in its two quiescent conditions. In Fig. 3 is shown a trigger circuit of this form constructed according to the teachings of this invention. In this embodiment tube 51 represents the single vacuum-tube element required for the circuit. In screen grid lead 52 is disposed winding 53 of a current-actuated relay switch 74 which, in the energized condition, is closed as shown in the diagram. In lead 75 of grid 56 is disposed winding 57 of a second current-actuated relay switch 58 which, in the de-energized condition, is open as shown in the diagram. The circuits, not shown, which may be connected to switches 74 and 58 may take wide variety of forms as in the case of the circuit shown in Fig. 1. In a manner which will be explained in the following paragraphs, the application of external signals to input terminals 59 and 60 results alternately in the energizing and de-energizing of winding 57 and in the de-energizing and energizing of winding 53. This circuit differs from that illustrated in Fig. 1 in that the winding 53 is energized and winding 47 de-energized in one of the two quiescent states and then reversed in the other state. This type of operation balances the relay current requirements as between the two states of the trigger circuit.

Cathode 61 of tube 51 is so connected to ground potential and dual screen grid 62 is so connected to positive potential 63 through winding 53 that a positive potential gradient exists in tube 51 for the acceleration of electrons from the space charge of cathode 61. The number of electrons leaving said space charge is controlled primarily by the control grids 54 and 55 with grid 54 presenting the most sensitive control means. In addition, grid 56 and anode 57 exert modifying effect on space current distribution as the electrons transverse tube 51.

Grid 54 is at ground potential during either quiescent condition of the circuit by virtue of its connection through resistance 64 and therefore acts to reduce space current flow in tube 51 only during the application of a negative triggering signal at input terminals 60. It therefore functions as a triggering grid and does not act primarily to alter the space current in such a manner as to maintain either of the possible equilibrium states of tube 51.

Grid 55 is so connected to positive potential 63 through resistances 65 and 66 and to negative potential 67 through resistance 68 that, in one quiescent state of the circuit, there is a low space current flow in the region between grid 55 and anode 57.

Grid 56 is so connected to high positive potential 69 through winding 57 that a positive potential gradient exists from screen 62 to grid 56. A negative potential gradient exists from grid 56 to anode 57 by virtue of the connection of anode 57 to lower positive potential 63 through resistance 66 and negative potential 67 through resistances 65 and 68.

The operation of the trigger circuit of Fig. 3 is similar to that of Fig. 1, except that grid 55 of Fig. 3, which functions to maintain the quiescent space current conditions of the circuit, does not act to cut off the flow of space current to screen 62 to the same degree that it does the flow to grid 56 and anode 57. Also, the proportions of resistors 65, 66, and 68 are such that the potential of grid 55, as determined solely by the current which would flow through resistances 65, 66, and 68 if no current flowed through the tube 51, is not low enough to cut off entirely the flow of electrons to grid 56 and anode 57. This potential of grid 55 is represented by potential $h$ of Fig. 4.

Figure 2:
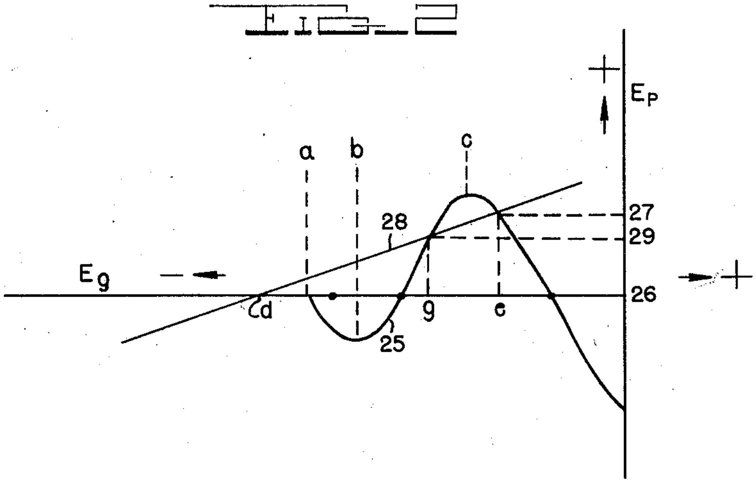
Fig. 2 is a plot of potential variations employed in explaining the embodiment shown in Fig. 1.
Figure 4:
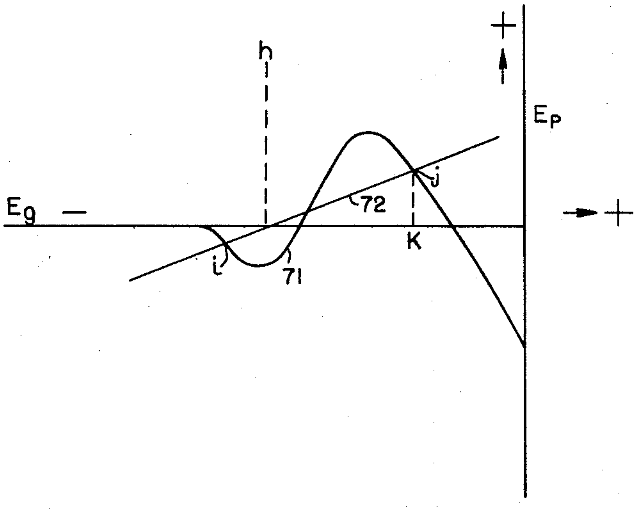
Fig. 4 is a plot of potential variation employed in explaining the embodiment shown in Fig. 3.

In Fig. 4 curve 71 has the same significance as curve 25, and line 72 has the same significance as line 28 of Fig. 2. The points of intersection of curves 71 and 72 again represent points of equilibrium only the extreme left and the extreme right-hand ones of which are stable. When the trigger circuit of Fig. 3 is in the quiescent state as represented by *i* of Fig. 4, the potential of grid 55 permits only a low space current flow in the region between screen 62 and anode 57. Therefore the primary electrons collected by grid 56 and the secondary electrons which reach it from anode 57 represent a very low current flow through lead 75. Winding 67 is therefore de-energized, and switch 58 is open. On the other hand, electrons from the cathode space charge flow freely to screen 62 and a current capable of energizing winding 53 flows in lead 52 and switch 74 is closed in this quiescent state.

A negative pulse applied at input 59 and communicated to grid 56 through capacitor 70 causes a positive signal to appear at grid 56 coincident with the trailing edge of the pulse. This positive signal at grid 56 momentarily increases the accelerating potential between screen 62 and grid 56 so that secondary emission from anode 57 is increased and its potential rises. This potential rise, fed back to grid 55 through resistance 65, starts the regeneration which results in the quiescent state indicated by *j* of Fig. 4. The potential *k* of grid 55 is sufficiently high to reduce the anode effect of screen 62 and thereby reduce the flow of screen current. This reduction in screen current through winding 53 results in its being de-energized and switch 74 opened during the second quiescent state of the trigger circuit. On the other hand, the anode effect of grid 56 increases and it collects a greatly increased number of secondary electrons from anode 57 so that current flow through winding 67 is increased and switch 58 closed during the second quiescent state of the circuit.

Thus the second quiescent condition of tube 51 corresponds to switch 74 open and switch 58 closed. In the first quiescent condition the current was a maximum in lead 52 and a minimum in lead 75. In the second quiescent condition the current was a minimum in lead 52 and a maximum in lead 75. This exchange of current magnitudes operates to make the current requirements of the trigger circuit more uniform, as between states of quiescence, and thereby offers advantages in certain applications.

Now let it be assumed that the second state exists in the trigger circuit, that is, the state in which space current is at its greatest value between screen 62 and anode 57. A negative pulse applied to the circuit via input 60 and communicated to grid 54 via capacitor 73 so reduces space current flow in tube 51 as to allow regeneration to re-establish the first quiescent condition indicated by *i* of Fig. 4.

Considerable variation is possible in utilizing the switching action of the secondary emission trigger circuits herein described. The relay coil windings used for purposes of illustration in Figs. 1 and 3 may be replaced by resistive loads, and, in general, utilization of the circuit is simply a matter of choice of the particular voltage or current variations which occur as between the two quiescent states.

To those well versed in the art it will be obvious that certain further changes may be made in the foregoing constructions, and different embodiments of the invention may be made without departing from the scope thereof; and since this is true, it is intended that all matter shown forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. An electron switch having a stable state including an anode, a cathode, a first grid element located between said cathode and said anode, a second grid element located between said cathode and said first grid element, a third grid element located between said second grid element and said cathode, means maintaining said third grid element at the same potential as said cathode when said electron discharge device is in said stable state, means for applying a first positive potential relative to said cathode to said anode, means for applying a second positive potential relative to said cathode to said first grid element, said second positive potential being more positive relative to said cathode than said first positive potential, said first positive potential and second positive potential providing a negative potential gradient in said electron discharge device from said first grid element to said anode, said negative potential gradient operative to provide a region of operation of said electron discharge device wherein the ratio of anode secondary electron emission to primary electron flow is less than unity and diminishes as the potential applied to said third grid element relative to said cathode increases from negative to positive, said stable state located in said region of operation, a first impedance connecting said anode and said second grid element to maintain said stable state under control of the potential on said anode relative to said cathode, a second impedance connecting said second grid element to a negative potential relative to said cathode, the ratio of said first impedance to said second impedance determining the location of said stable state in said region of operation, and means for applying a signal to said third grid element to effect operation of said electron discharge device in said stable state.

2. An electron discharge switch having a first stable state and a second stable state comprising an electron discharge device including an anode, a cathode, a first grid element located between said anode and said cathode, a second grid element located between said first grid element and said cathode, and a third grid element located between said second grid element and said cathode, means maintaining said third grid element at the same potential as said cathode when said electron discharge device is in said first stable state and in said second stable state, means for applying a first positive potential relative to said cathode to said anode, means for applying a second positive potential relative to said cathode to said first grid element, said second positive potential being more positive relative to said cathode than said first positive potential, said first positive potential and second positive potential providing a negative potential gradient in said electron discharge device from said first grid element to said anode, said negative potential gradient operative to provide a first region of operation of said electron discharge device and a second region of operation of said electron discharge device, the ratio of anode secondary electron emission to primary current flow in said first region of operation being greater than unity and decreasing as the potential applied to said third grid element relative to said cathode increases from negative to positive, said ratio of anode secondary electron emission to primary current flow in said second region of operation being less than unity and decreasing as said potential applied to said third grid element relative to said cathode increases from negative to positive, said first stable state located in said first region of operation, said second stable state located in said second region of operation, a first impedance connecting said anode and said second grid element to maintain said first stable state and said second stable state under control of the potential on said anode relative to said cathode, a second impedance connecting said second grid element to a negative potential relative to said cathode, the ratio of said first impedance to said second impedance determining the location of said first stable state in said first region of operation and said second stable state in said second region of operation, means for applying a first signal to said first grid element to shift the operation of said electron discharge device to said first stable state, and means for applying a second signal to said third grid element to shift the operation of said electron discharge device to said second stable state.

References Cited in the file of this patent

UNITED STATES PATENTS

| | | |
|---|---|---|
| 2,060,095 | Mathes | Nov. 10, 1936 |
| 2,168,165 | Koller et al. | Aug. 1, 1939 |
| 2,252,457 | Cockerell | Aug. 12, 1941 |
| 2,274,369 | Janssen | Feb. 24, 1942 |
| 2,275,016 | Koch | Mar. 3, 1942 |
| 2,293,177 | Skellett | Aug. 18, 1942 |
| 2,309,019 | Skellett | Jan. 19, 1943 |
| 2,456,029 | Snyder | Dec. 14, 1948 |
| 2,459,181 | Rosen et al. | Jan. 18, 1949 |

FOREIGN PATENTS

| | | |
|---|---|---|
| 448,021 | Great Britain | Feb. 27, 1935 |